United States Patent [19]

Rasekhi et al.

[11] 4,393,389

[45] Jul. 12, 1983

[54] MAGNETIC TONER TRANSFER METHOD AND APPARATUS

[75] Inventors: Houshang Rasekhi, Convent Station, N.J.; Alfred M. Nelson, Redondo Beach, Calif.

[73] Assignee: Wang Laboratories, Inc., Lowell, Mass.

[21] Appl. No.: 228,526

[22] Filed: Jan. 26, 1981

[51] Int. Cl.³ ...................... G01D 15/06; G03G 15/16

[52] U.S. Cl. .............................. 346/153.1; 355/3 TR; 355/14 TR

[58] Field of Search ................. 355/3 R, 3 TR, 3 CH, 355/14 TR, 14 CH; 346/153.1, 160.0

[56] References Cited

U.S. PATENT DOCUMENTS 3,345,944 10/1967 Simmons ...................... 346/153.1 X
4,131,358 12/1978 Windele .......................... 355/3 TR
4,140,962 2/1979 Quinn ......................... 355/3 CH X
4,169,673 10/1979 Sato et al. ........................ 355/3 TR
4,175,265 11/1979 Nelson et al. .................... 346/153.1
4,260,235 4/1981 Stack .............................. 355/3 CH

FOREIGN PATENT DOCUMENTS 2750612 5/1979 Fed. Rep. of Germany ... 355/3 TR
52-37042 3/1977 Japan ............................... 355/3 TR

*Primary Examiner*—Fred L. Braun
*Attorney, Agent, or Firm*—Michael H. Shanahan; Joseph E. Funk

[57] ABSTRACT

Magnetographic printing, method and apparatus are used to generate letter-quality, relatively high speed transfer of magnetic toner particles from a magnetic tape to paper. A pretransfer force ($f_1$) holding the toner to the tape is established which may be magnetic, or both magnetic and electrostatic in nature. The transfer operation employs relatively high speed approaching movement of the tape toward the paper in a controlled manner such that forces ($f_2$) exerted on the toner particles due to the rapidly closing movement including forces created by air currents are collectively less than the toner-holding force ($f_1$) for any instantaneous separation between the tape and paper. The operation may include the use of a bias voltage to generate a component of the electrostatic holding force and the use of a corotron to deposit electrostatic charge on the magnetic toner particles. The controlled movement of the tape toward the paper is achieved with a cam in one embodiment and with a solonoid in another embodiment.

17 Claims, 13 Drawing Figures v
90
A
B
B'
C
D
E
0
t

I
71
71b
t 71a
v
t d
44
t

V
(A')
A
B
B'
C
D
E
0
-V
t
PRE TRANSFER
POST TRANSFER
TRANSFER PERIOD

MAGNETIC TONER TRANSFER METHOD AND APPARATUS

BACKGROUND OF THE INVENTION

This invention relates to magnetographic printing generally, and more particularly to non-impact electrostatic toner transfer techniques for both improving print quality and increasing print speed.

Often, when improvements are made in print quality, print speed (image transfer speed) is reduced, and when print speed is increased, print quality is reduced. For example, impact printing devices such as the electric typewriter or the so-called daisywheel type impact printer produce high quality print but are relatively slow. These devices print copy material by striking a preformed character against an inked ribbon onto paper. When using a carbon film type ribbon, these devices produce high quality print (i.e., letter-quality print as compared to print of lesser quality produced, for example, by dot matrix printers, thermal printers, computer line printers, and the like), but are generally noisy and print at the comparatively slow rate of 15–55 characters (symbols) per second. Certain other impact printers such as computer line printers are faster (e.e., they are capable of printing in excess of 900 lines per minute) but produce poor quality (i.e., non-letter-quality) print.

This print quality/print speed trade-off problem is also reflected in magnetic or magnetographic printing systems. Of those magnetographic printing systems which transfer images by impact, contact of the record medium (i.e., magnetic tape, drum, or other means carrying the toned magnetic image) with the paper introduces additional problems of contamination and degradation of the record medium. For example, in the system described in U.S. Pat. No. 3,735,416 issued to Ott, the useful life of the magnetic belt is shortened significantly due to toner particles becoming embedded in or otherwise contaminating the belt surface as a result of pressure of the record medium against the paper. This contamination causes excess toner to accumulate on the tape surface, soiling the non-image areas (background areas) of the record medium and, hence, the paper, producing a smudged or dirty background effect on the paper. As in Ott's system, the system described in the U.S. Pat. No. 3,740,265 issued to Springer transfers toner from a record medium (magnetic belt) to paper by means of pressure. This causes toner to become crushed into the surface of the belt, thus contaminating the belt and causing toner background to build-up, upon successive image transfers, in an unsightly manner on the paper. In U.S. Pat. No. 3,254,646 issued to Umera, a toned magnetic belt is struck by a hammer causing the belt to impact the paper for transfer of the toned image from the belt to the paper. In U.S. Pat. No. 3,749,833 issued to Rait, the transfer of toner particles to paper is accomplished by means of pressure rollers. Again, in both Umera and Rait, toner background problems would be encountered and belt or roller life would be shortened due to the toner particles becoming embedded in the surface of the magnetic medium.

Other magnetic or magnetographic systems attempt to avoid this problem of contamination of the record medium by maintaining an air gap between the record medium and the paper, and transferring the toner image electrostatically rather than by impact or applied pressure. One such system is described in U.S. Pat. No. 3,477,368 issued to Spaulding. Another such system is described in U.S. Pat. No. 4,175,265 issued to Nelson et al.

Generally, in both types of systems (impact and electrostatic transfer systems) the record medium and/or paper are moved relative to each other prior to or during transfer. However, we have found that as the speeds of relative approaching motion between the toned medium and the toner-receiving medium are increased to meet higher print speed requirements, the associated velocities of escaping air (aerodynamic forces) in the transfer region proximate to the record medium and the paper increase correspondingly, ultimately causing disruptive air currents to form in the transfer region and the toner present on either the medium or paper to disperse or spread. This problem is amplified where it is intended that there be area contact between the media, as opposed to line contact systems such as are characteristically embodied in electrophotographic copying systems. The spread or loss of toner is most visible at the edges of the character images. This toner disturbance produces poor character image edge acuity and unwanted background in, between, and around the character images. Further, the air currents increase and are cumulative to a maximum level at or proximate to the physical edges of the toned medium. Thus, those characters or protions thereof which are present near the edges of the medium tend to experience disproportionately greater disturbances than characters or portions thereof not so near the edges of the medium.

In some systems that use electrostatic transfer, a high voltage (for example, a voltage greater than 1000 volts) is found to be necessary for transfer of toner from the record medium to paper. To reduce this high voltage necessary during the transfer process, some systems teach the application of a form of pretransfer or bias voltage. However, this pretransfer or bias voltage, which is applied just prior to transfer, is intended to facilitate transfer of toner to paper and tends to weaken the bond between record medium and toner. A system of this type is described, for example, in U.S. Pat. No. 3,160,091 issued to Schwertz. Unfortunately, in such systems the likelihood of toner spread is also substantial, because the effect of the air currents upon the toner particles (i.e., the movement of air occasioned by the relative movement of the paper and the record medium) tends to increase the spread of toner as a result of the binding force between toner and latent image being weakened due to the applied bias voltage.

What is needed and would be useful, therefore, is a toner transfer method and system capable of providing high quality print without degrading image edge acuity or providing unwanted background effects when printing at high speed, and such is a principal object of this invention.

SUMMARY OF THE INVENTION

In accordance with the present invention, apparatus and method are provided for transferring toner particles at a relatively high speed from a magnetically created latent image onto a toner-receiving medium such as paper without sacrificing edge acuity or providing unwanted background, the latent image having been magnetically recorded by known means on a magnetizeable web such as magnetic tape.

The invention provides close control of the velocity of the relative approaching (and separating) movement between the toned medium (toned tape segment) and the toner-receiving medium (paper) at the transfer station, maintaining such velocity at or below a predetermined maximum relatively high speed velocity which varies as a function of the instantaneous separation between the two media.

The invention provides further for a carefully timed and controlled electrostatic transfer of electrostatically precharged toner particles from the tape medium to the paper. This comprises providing a bias electrostatic field to the toner at the transfer station during relative movement of the two media which augments the toner-tape attracting forces and tends to prevent the premature transfer of toner to the paper; and providing a trasfer electrostatic field to the toner, when uniform contact has been established between the media, for a sufficient time to ensure substantially complete transfer of the toner to the paper medium. This time includes the point of actual separation of the media and a period in which a predetermined separation distance is again reached between the media.

According to a broader method and apparatus aspects of the invention, there is provided letter-quality, relatively high speed transfer operation—for example, 150 transfers per minute or greater, at one to six image lines per transfer involving the transfer of the toner particles being predeterminably arranged on a surface of a first medium to a toner-receiving second medium, which operation comprises the establishment of at least a first pretransfer force of attraction ($f_1$) between the toner and the first medium, and moving the first and second medium relative to one another such that the maximum force ($f_2$) exerted on the toner particles due to high-speed movement of the first medium relative to a proximate toner-receiving second medium is less than force ($f_1$) for any instantaneous separation between the first and second media.

According to further broader method aspects of the invention, there is provided, in a process of high-speed transfer of toner particles from a toned first medium to a toner-receiving second medium at a given transfer station arrangement, which particles are predeterminably arranged on a surface of a first medium of preselected width and have associated therewith a preestablished toner holding force, the combination of steps which comprises the determination of the instantaneous maximum velocity ($v_m$) of relative approaching movement of the first and second media as a function of: (1) the instantaneous separation distance therebetween, (2) the first medium's width, (3) the toner attracting force and (4) a preselected maximum toner particle size, at and below which maximum velocity the toner particle arrangement on the first medium is mantained without substantial disruption; and effecting relative approaching movement between at least respective portions of facing surfaces of the first and second media until contact occurs therebetween, at a velocity (v) where $v \leqq v_m$ for any separation distance.

Also according to the method aspects of this invention, there is provided a method of toned image transfer which comprises effecting, in succession, relative approaching movement, contact, and relative separating movement between at least respective portions of the facing surfaces of a toned fired medium and a toner-receiving second medium substantially without disturbing the toner particle arrangement; subjecting the toner particles to a first electrostatic field, at least during the period of relative approaching movement beginning with a predetermined first separation distance being reached between said first and second medium portions, said first electrostatic field having a predetermined magnitude and a direction which urges the toner particles substantially toward the first medium and away from the second medium; and discontinuing the first electrostatic field and subjecting the toner particles to a second electrostatic field having a direction which urges the toner particles substantially toward the second medium and away from the first medium, for a predetermined time period following contact between said first and second medium portions, the close of which period is defined by a predetermined second minimum separation distance between the first and second medium portions being reached on relative separating movement thereof, said second electrostatic field having a predetermined minimum magnitude at least when separation of the first and second medium portions is effected.

According to the broader apparatus aspects of the invention, there is provided an apparatus for toned image transfer comprising a facing pair of media, the first of which is a toned endless medium (or fixed length medium) of pre-established width and having associated therewith a pre-established toner attracting force and the second being a toner-receiving medium; means for effecting high-speed relative approaching movement between the first and second media in accordance with a selected first velocity profile (acceleration) which includes an instantaneous maximum relative approaching velocity which is proportional to the width of and the toner attracting force associated with the first medium, at or below which instantaneous maximum velocity degradation of the toner particle arrangement is avoided; control means for effecting termination of the high- speed relative approaching movement upon a predetermined separation being achieved between the two media, which separation is proportional to the width of and the toner attracting force associated with the first medium; and means for generating relative approaching movement. between the two media in accordance with a selected second velocity profile (deceleration), whereby the two media are brought into contact substantially without toner particle arrangement degradation.

The invention achieves the combined attributes of high speed, high quality and high reliability in a relatively simple and economic way. Relative movement between the media and ultimate contact therebetween is realized in the single-direction, reversable and closely controlled displacement of a single element. Transfer is accomplished with relatively low contact pressure between the media, with precharging of the toner, in deriving high efficiency (e.g., as high as 92%) of toner transfer, with high edge acuity and low background, over relatively long-term operation substantially without tape contamination. Yet, these accomplishments are achieved through the application of a relatively substantially low transfer field (as compared, for example, with conventional electrophotographic systems) and, consequent low applied voltage.

BRIEF DESCRIPTION OF DRAWINGS

The above-mentioned objectives and features will become better understood with reference to the following detailed description taken in conjunction with the accompanying drawings, in which.

DESCRIPTION OF PREFERRED EMBODIMENTS

Figure 1:
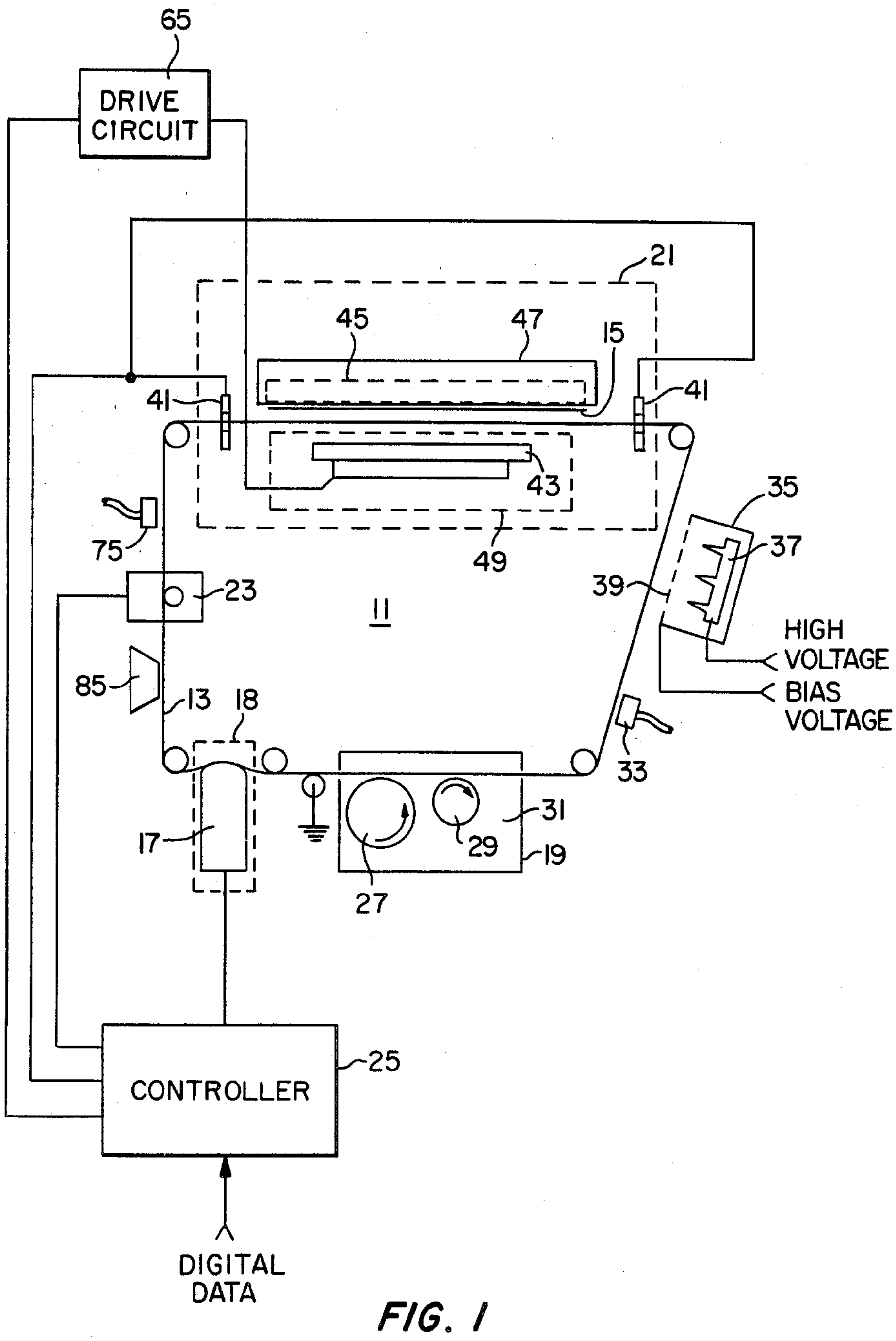
FIG. 1 is a combined schematic and block diagram of a system incorporating the present invention.

Referring now to FIG. 1, there is shown a magnetographic printing apparatus or system 11 responsive, for example, to applied digital data, for recording data images on an endless magnetizable medium or web such as a magnetic tape or band 13, for toning or developing the image, and for transferring the toned image to paper 15 to produce high quality printed output at relatively high-speed operation. The magnetizable medium 13 is electrically conductive. The apparatus includes a magnetic recording head 17 for creating a magnetic latent image on tape 13, a developer station 19 for developing the latent image by applying toner (dry magnetically attractable ink particles contained in the developer station) to the latent image, and a transfer station 21 for transferring toner from the developed image to paper 15 or some other medium. The latent image creation and development operations may be performed in much the same manner as described in U.S. Pat. No. 4,110,758 issued to Nelson et al.

As shown in FIG. 1, tape 13 is operatively coupled to a shaft of motor 23 and is advanced by the motor as a closed loop through the various stations of the system. As the tape 13 passes recording station 18, recording head 17 records a magnetic latent image onto the tape. The tape is then advanced to developer station 19 where toner applicator brush or drum 27 develops the latent image by applying magnetic toner particles to the tape. The magnetized latent image areas on the tape attract the toner, thereby developing (toning) these image areas. Excess toner is removed from the tape by a scavenger brush or drum 29 and returned to toner reservoir 31. As a further aid in cleaning the tape (i.e., removing unwanted toner from the tape), a first vacuum outlet 33 coupled to a vacuum source (not shown) provides a suction of air across the imaged (front) surface of the tape to remove background toner particles not tightly bound by the magnetic forces exerted by the image areas.

Following developing and cleaning, the toner particles remaining on the tape are charged by a scorotron 35. The scorotron provides an ionizing source 37 and a bias screen 39 proximate to the tape surface to charge the toner particles on the tape prior to transfer of the toner to the paper. The screen 39 of the scorotron 35 is maintained at a constant potential to ensure that the toner receives a uniform charge.

After the recorded latent image is developed, the tape is cleaned, and the toner particles on the image areas are charged, the tape 13 is advanced to transfer station 21. In the example of embodiment here depicted, the tape 13 is comprised of a predetermined number (e.g., three) of segments for recording latent images. A hole (not shown) is formed through the tape preceding each such segment, a segment representing a length of tape used to print a line of characters (symbols). It will be appreciated that tape 13 could provide two or more lines of characters simultaneously to the transfer station. As a tape segment is moved into position in transfer station 21, light from a light source of photosensor arrangement 41 passes through the hole and is detected by a detector of photosensor 41. In response to the detection of the hole, photosensor arrangement 41 applies a signal to controller 25 which brakes and stops the motor 23 (e.g., by applying a reverse polarity signal, then no signal to the motor) to position the tape segment within transfer station 21 in preparation for image transfer.

Figure 2:
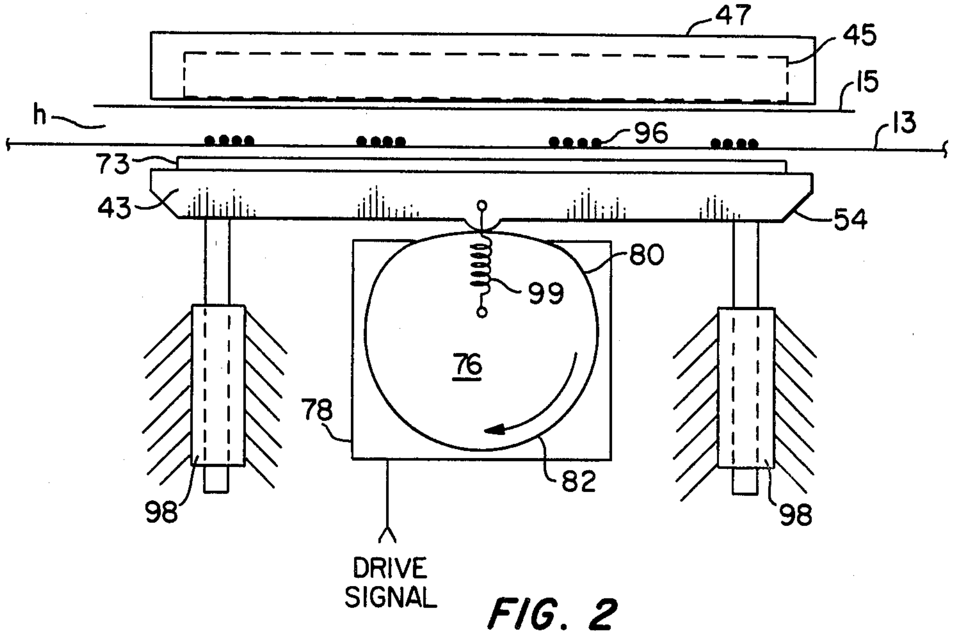
FIG. 2 is a combined schematic and block diagram illustrating a preferred transfer station embodiment of the system of FIG. 1, in accordance with the invention.
Figure 3:
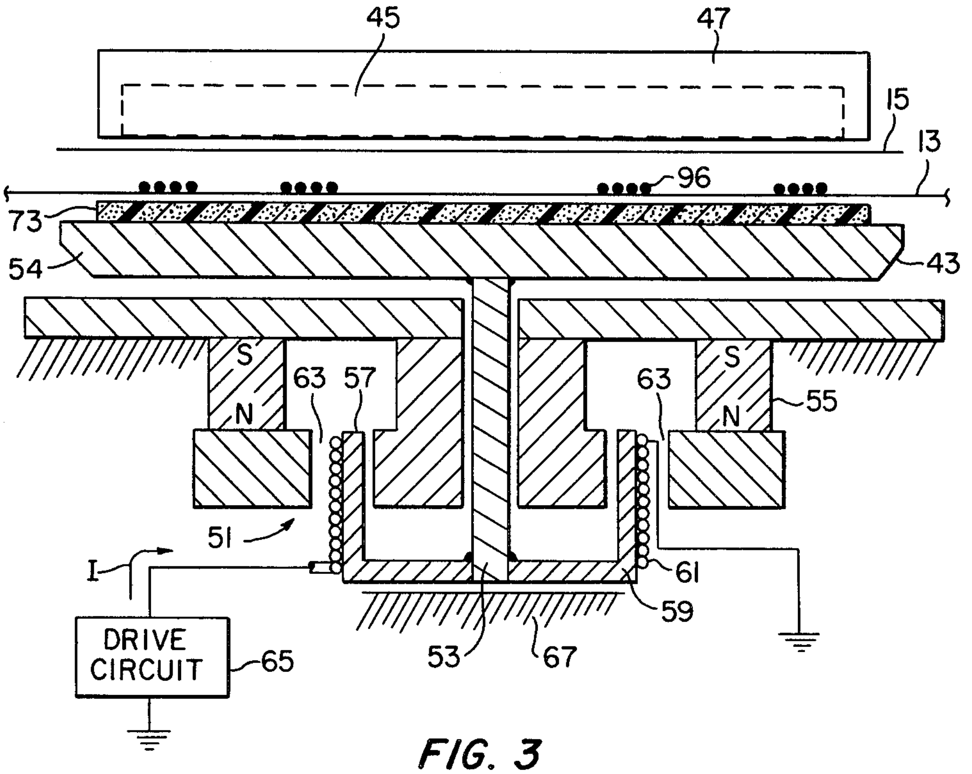
FIG. 3 is a combined schematic and block diagram illustrating a second embodiment of transfer station of the system of FIG. 1, in accordance with the invention.

With the tape segment having the toned image positioned thus for transfer, a moveable platen 43 of a tape positioner 49 is then actuated from the controller 25 via drive circuit 65 to press the tape segment with its toned image into gentle contact with the paper 15. A transfer voltage (pulse) is then applied to electrode 45 contained in hollow (vacuum) back plate 47 located adjacent to and above paper 15 which creates an electrostatic force attracting the toner (the toned image) to the paper during the transfer period. While electrode 45 is shown in FIGS. 2 and 3 somewhat apart from paper 15 for ease of illustration, the electrode is, in fact, in contact with the paper during transfer. Following image transfer, platen 43 is returned to an open (non-contact) position.

The tape is then advanced by motor 23 as governed by controller 25 such that the tape segment corresponding to the transferred developed image passes by a second vacuum outlet 75 which removes any residual toner particles from the tape's surface. Thereafter, the tape segment advances to a station 85 where the imaged portions are magnetically reoriented, thus preparing the tape segment for the next imaging operation.

FIG. 2 shows a preferred embodiment of the transfer station 21 of FIG. 1. The segment of tape 13 carrying an imaged line of text is shown in position between the paper 15 and platen portion 43 of the transfer station 21 of FIG. 1. Platen 43 includes a horizontal portion 54 bearing a resilient covering 73 on its operative face. Situated behind the paper 15 is the transfer electrode 45 as contained in the hollow vacuum backplate 47. The paper 15 is maintained uniformly on the flat lower surface of backplate 47 by the presence of a controlled negative pressure thereon which communicates with the paper via a suitable arrangement of apertures (not shown) in the backplate's lower surface. As illustrated, an initial gap h (exaggerated for ease of understanding) exists between the tape medium 13 and the paper 15.

Platen 43 is mounted upon a pair of rods housed in respective relatively long bearings 98 suitably affixed to the frame (not particulary shown) of the system. Movement of platen 43 is governed by a drive arrangement 78 which comprises an eccentrically mounted cam 76 having cam surfaces 80 and 82 in contact with the lower surface of platen 43. Cam 76 is secured to platen 43 via a spring 99, and the cam drive shaft is securely maintained in position relative to the system's frame.

Figures 5A, 5B, 5C, 5D, 5E:
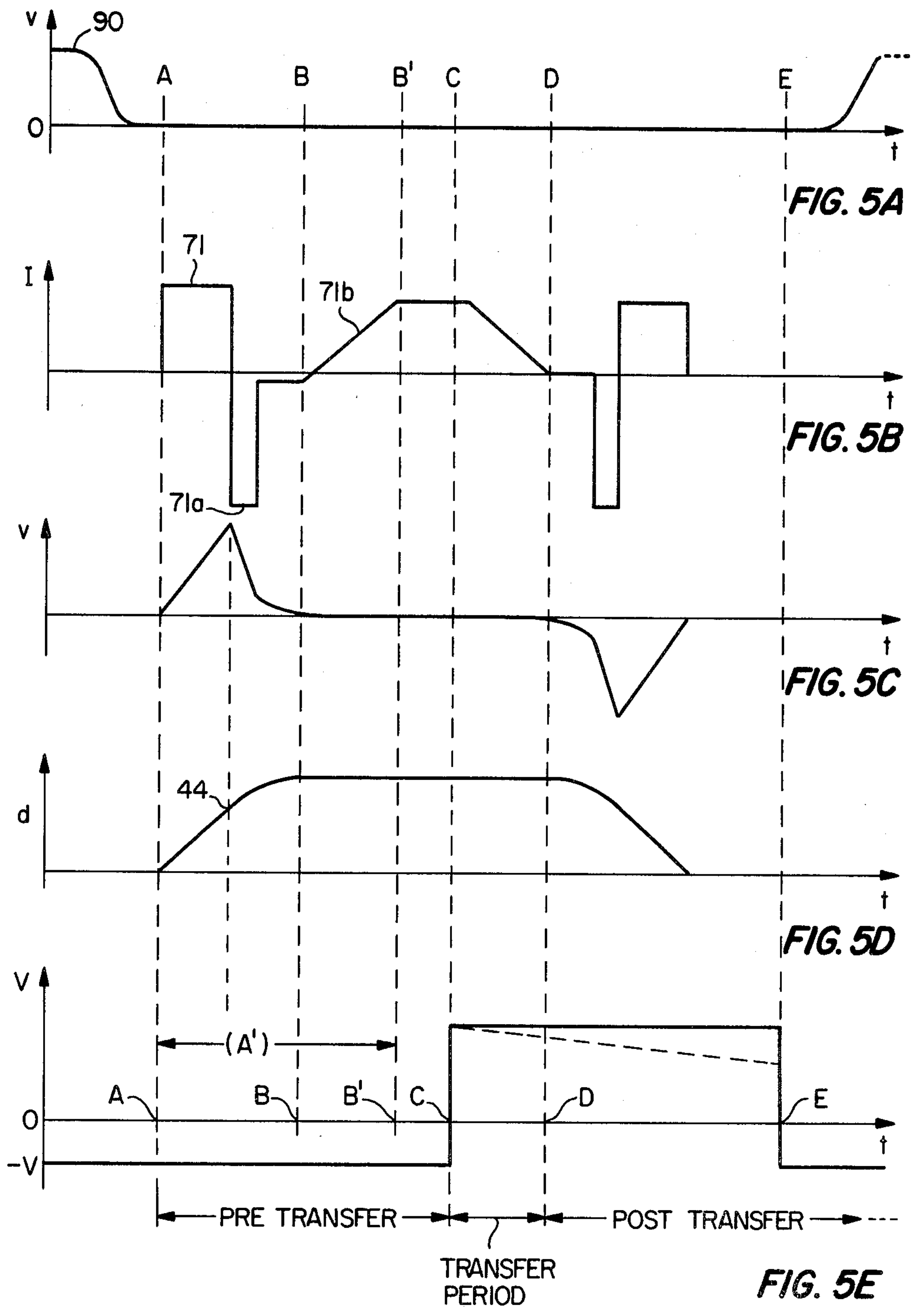
FIGS. 5A–5E are waveform diagrams illustrative of principal events occurring in connection with the transfer station of FIGS. 2 and 3.
Figure 6A:
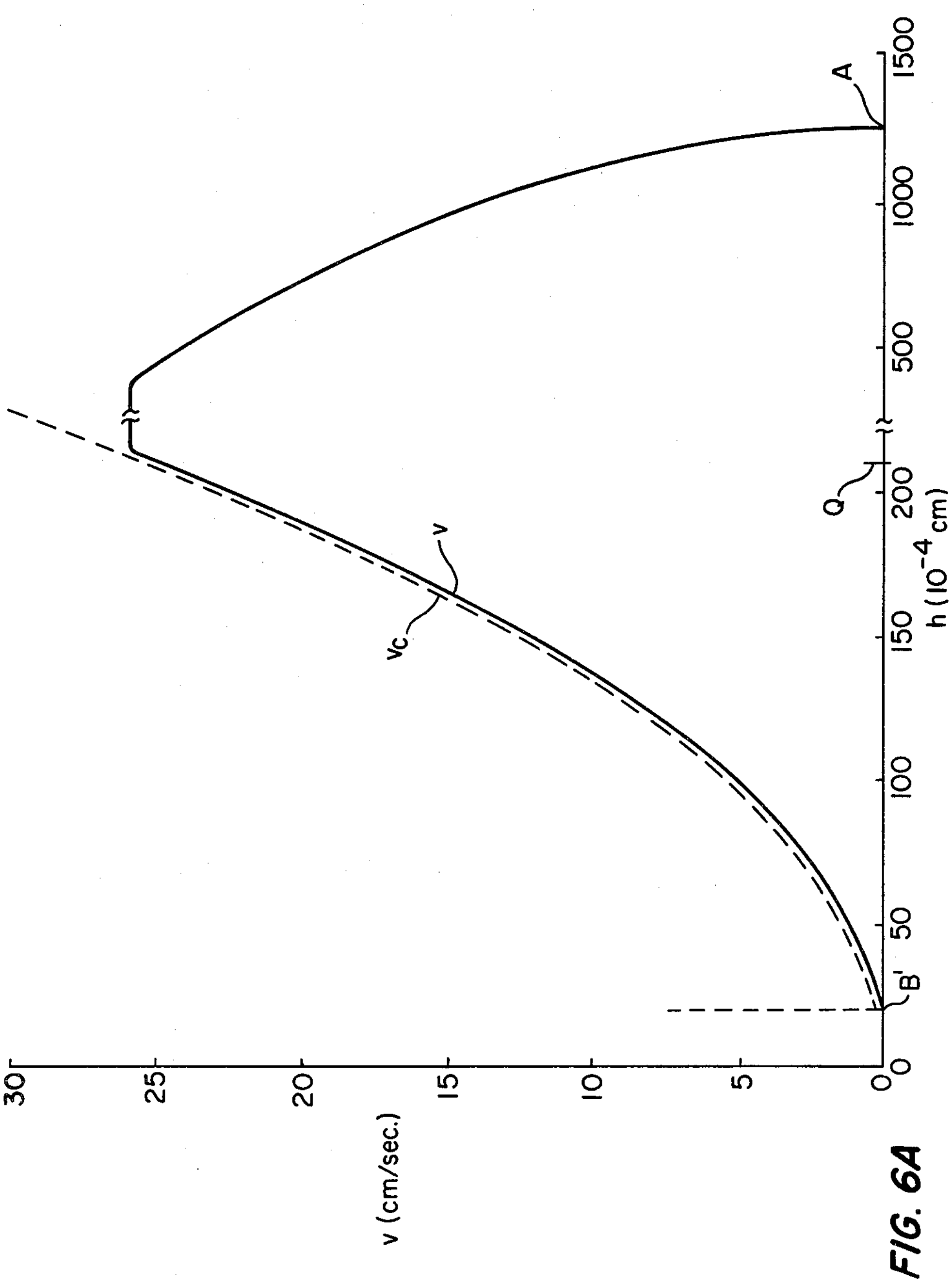
FIGS. 6A and 6B are waveform diagrams illustrating velocity profiles of relative approaching movement of the tape and paper as a function of respectively instantaneous separation and time.
Figure 6B:
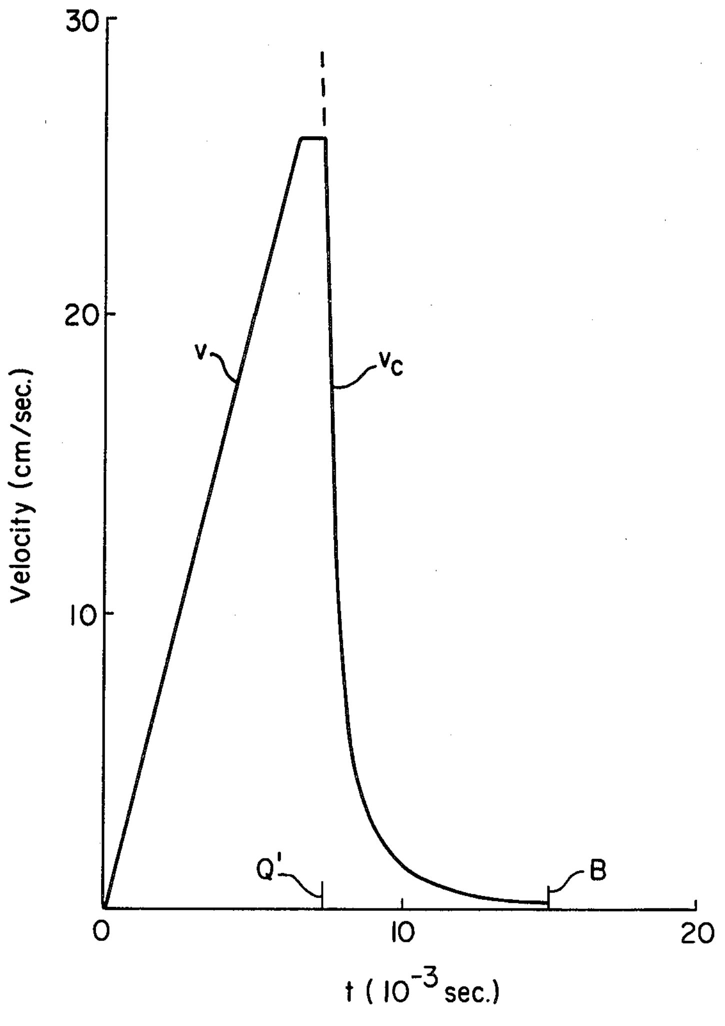

In operation, a drive signal is input to arrangement 78 (FIG. 2) which actuates and governs continuous rotation of the cam whereby the cam surfaces 80 and 82 thereof urge platen 43 upward at an instantaneously varying velocity (e.g., as depicted in FIGS. 5C and 6B) such that the tape 13 controllably approaches the paper 15 situated on the lower surface of backplate 47, in accordance with the invention. Alternatively, arrangement 78 could comprise an eccentrically mounted cam having a less complex operating surface, which is driven by a stepping motor fed by an input control or drive signal of varying frequency corresponding to a selected velocity profile as shown in FIG. 6B. Design of a cam in accordance with the velocity profile may be made according to known methods reflected in the text "Cams" by H. Rothbart published by Wiley & Sons, New York, U.S.A.

In another alternative arrangement (not particularly shown), unit 78 could be replaced by a spring-loaded bellows arrangement suitably coupled to a hydraulic system terminating in a cam-driven second bellows arrangement, the cam being contoured or configured so as to provide movement of the platen in accordance with a selected velocity profile. In this way, substantially all of the mechanical apparatus associated with the platen may be housed remotely from the transfer station, without sacrificing operation efficiency.

FIG. 3 shows another embodiment of the transfer station 21. Tape positioner 49 (FIG. 1) comprises, as before, moveable platen 43, and in this embodiment a vertically moveable coil actuator 51. Platen 43 includes a vertical portion 53 and a horizontal or bar portion 54. Vertical portion 53 serves to rigidly couple bar portion 54 to actuator 51. Actuator 51, in turn, includes a ring-shaped permanent magnet 55 and an armature 57. The armature 57 comprises a cylindrically shaped member 59 (illustrated in cross-section in FIG. 3) about which is wound a predetermined number of turns of conductor 61. Armature 57 and the vertical portion 53 of platen 43 are positioned for vertical motion within air gap 63 of ring magnet 55. Member 59 is constructed preferably of aluminum, which serves to damp the movement of the actuator to eliminate jitter.

In response to a drive current signal applied by drive circuit 65 to armature 57 of actuator 51, a force proportional to the current in the conductor 61 in the magnetic field provided by ring magnet 55 serves to move platen 43, and in particular the horizontal bar 54, to bring the tape 13 rapidly into contact with the paper 15. Separation thereafter is achieved through the combination of the drive current and gravity.

Figure 4A:
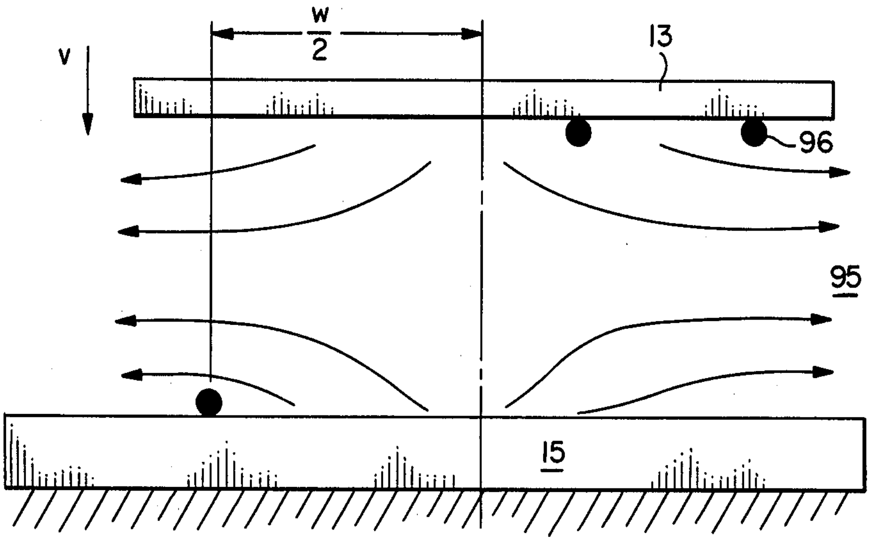
FIGS. 4A and 4B illustrate air currents generated by the relative approaching movement of the toned medium and paper and the tendency thereof to affect toner particle arrangement.
Figure 4B:
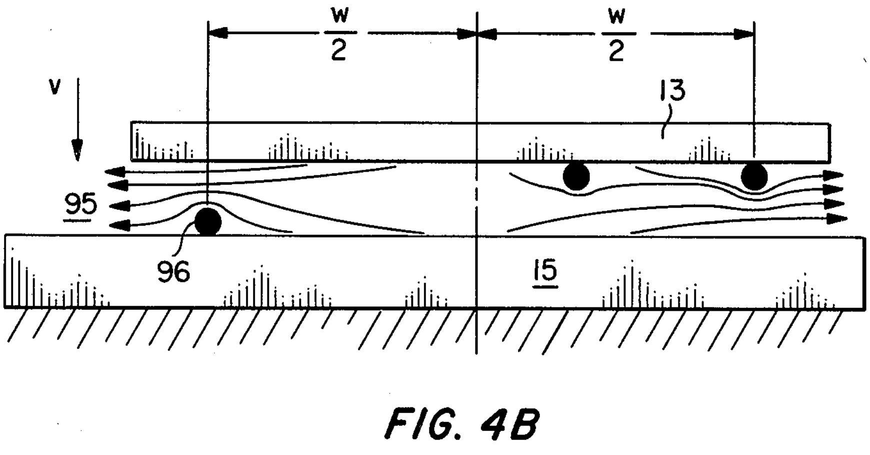

FIG. 4A illustrates the two-dimensional air currents 95 caused by the relative approaching movement of tape 13 and paper 15 at a velocity v for a relatively large separation distance between the tape and paper. Of course, similar air currents (though opposite in direction) are generated in reverse during relative separating movement between the tape and paper. As shown, the air currents are directed outward and away from the center of the tape, tending to influence (disturb) the toner particles 96. In FIGS. 4A and 4B particularly, the relative dimensions of tape 13, toner 96, paper 15, etc. have been exaggerated for ease of illustration and understanding.

FIG. 4B shows the generated air currents 95 for the case of a relatively smaller tape-to-paper separation and how the toner particles 96 are then affected thereby. As illustrated, the toner particles farther away from the center line of the tape (i.e., toward the edge of the tape) experience higher air currents than do particles nearer the center and are, therefore, more vulnerable to the potentially disturbing forces caused by the air currents. Thus, "w" in FIGS. 4A and 4B is that width of the tape which accounts for the largest disturbing forces, i.e., those forces which are experienced by the toner particles near the edges of the tape.

For the particular case of a narrow tape (narrow in comparison to its length within the transfer station and to the dimensions of the paper), after repeated calculations and empirical tests, the instantaneous critical (maximum) velocity at which the tape may be allowed to approach paper, without creating a force ($f_2$) that would disturb the toner particles, has been found to be approximately according to the following equations:

$$v_c = f_1^{\frac{1}{2}} (k\rho)^{-\frac{1}{2}} \cdot h^2/r^2 \cdot l/w \quad \text{(I)}$$

$$f_2 = v^2 \left( k\rho \frac{r^4}{h^4} w^2 \right) < f_1, \text{ and } v \leqq v_c \quad \text{(II)}$$

where

- $v_c$ is the tape critical velocity,
- v is the actual or instantaneous tape velocity,
- $f_1$ is the total force holding the toner particles to the tape,
- $f_2$ is the disturbing or lift force exerted on a toner particle by the air currents generated between the tape and paper,
- $\rho$ is the density of the air (e.g., $1.3 \times 10^{-3}$ gm/cc),
- h is the instantaneous separation distance between the tape and paper media,
- r is the radius of one of the largest sized toner particles, expected in significant proportion,
- w is the width of the tape, and
- k is a tape geometry factor or proportionality constant $\approx 9\pi$ for tape configurations where the ratio of tape width (w) to tape segment length (l) within the transfer region is $<<1$ (e.g., where $w \leqq 2.5$ cm and $l = 25$ cm in the examples depicted herein). As this ratio approaches 1, k would become $<9\pi$.

Referring to equation I, it can be observed that the instantaneous tape-to-paper critical (maximum) velocity is directly proportional to the square of the instantaneous tape-to-paper distance (h) and inversely proportional to the square of the radius (r) of the toner particles and the width dimension (w) of the tape medium. A direct relationship between the critical velocity ($v_c$) and the square root of the air current forces ($f_2$) generated between tape and paper is also shown. Equation I in particular predicts the relative sensitivity of the tape critical velocity ($v_c$), to the separation distance (h).

To avoid disturbing the arrangement of the toner particles during relative approaching movement, and indeed relative separating movement as well, the instantaneous tape velocity (v) must not exceed the instantaneous critical velocity ($v_c$), expressed by equation I in terms of instantaneous relative separation (h). In other words, as shown in equation II, the air current (aerodynamic) forces ($f_2$) must remain less than the total toner-holding force ($f_1$). Total toner-holding force ($f_1$) is equal to the sum of the magnetic and electrostatic forces ($f_m+f_e$ or alternatively $f_m+f_e+f_b$, described hereinafter) holding the toner onto the tape.

FIG. 5A illustrates the tape transport velocity profile of a toned segment of the tape in the vicinity of the transfer station. FIG. 5B shows a preferred drive current waveform (if employing the embodiment of FIG. 3) applied by drive circuit 65 to coil 57 of actuator 51. FIG. 5C shows a platen velocity profile corresponding, for example, to the rotation of cam 76 (FIG. 2) or the drive current (FIG. 5B) applied from drive circuit 65 to actuator 51 (FIG. 3). FIG. 5D shows platen displacement effected by cam 76 (FIG. 2), or effected by actuator 51 away from fixed stop 67 (FIG. 3). FIG. 5E illustrates the bias (e.g., −100 volts) and transfer (e.g., +600 volts) potentials which effect the electrostatic forces governing the transfer of the toner. It is to be noted that FIGS. 5A-5E are exemplary and are somewhat exaggerated for ease of illustration.

Once the toned portion of tape 13 has arrived at the transfer station 21, the tape is brought to a halt relative to platen 43 and electrode 45 as shown by curve 90 of FIG. 5A. A drive signal input to cam drive arrangement 78 (FIG. 2) causes the platen 43 and thus the toned web 13 to rapidly accelerate (e.g. at approximately $4\times10^3$ cm/sec$^2$) toward the paper as indicated in FIG. 5C. Alternatively, current pulse 71 of FIG. 5B causes actuator 51 and thereby platen 43 and the toned web 13 to rapidly accelerate toward the paper 15. Thus, point "A" in FIGS. 5A-5E is that point in time at which the relative movement between the magnetic tape 13 and the paper 15 begins.

When the displacement is such that the distance between the two media becomes relatively small, the velocity of the tape has to be carefully limited so as to not exceed the critical tape velocity to minimize the effects of the air currents generated by the approach of the tape 13 to paper 15 (FIGS. 5C and 5D). The combination of the shape of the cam surface 80, 82 (FIG. 2) and the spring force acting between the platen 43 and the cam shaft result in slowing down the approach velocity of the tape (FIG. 5C) and ultimately establishing a first tape-paper contact at a point "B" in time.

In the case of the arrangement of FIG. 3, when the platen 43 reaches a selected distance of displacement 44 from the paper (FIG. 5D), the drive current 71 is reversed as shown in FIG. 5B to effect deceleration (e.g. at approximately $10^4$ cm/sec$^2$) of the platen and tape or otherwise limit the tape velocity (v) to equal or less than the critical relative approaching velocity ($v_c$). This reverse current, i.e. pulse 71*a*, has a magnitude, as shown, greater than pulse 71 but with a duration considerably less than (e.g. $<\frac{1}{2}$) the duration of pulse 71. The absolute magnitude of the drive current is then reduced to a nominal reversed-direction value to allow the platen and tape to coast for a short while. This approach-movement segment of the drive current profile of FIG. 5B thus enables the platen to be initially accelerated at approximately four gravities, the decelerated at approximately ten gravities and finally allowed to coast to effect a gental contact between the tape and the paper at point "B". The coasting period is ended with a relatively gradual ramp pulse 71*b* (FIG. 5B) which again tends to urge the platen in the upward direction until contact is uniformly established. The ramp pulse 71*b* thus ensures substantially uniform pressure between tape 13 and paper 15, and "B'" is the point in time at which the toner particles are evenly (uniformly) sandwiched between the tape 13 and paper 15 and the tape becomes fully at rest with the paper, ready for transfer.

During the entire time period between points A and B, actually between points A and C and somewhat before A, as shown in (FIG. 5E), the toner particles are subjected to an electrostatic field force ($f_b$) generated by means of an applied bias voltage which augments the existing magnetic attractive force ($f_m$) between tape and toner and electrostatic attracting forces ($f_e$) between tape and toner provided by precharging the toner, such that the toner particles are urged to remain on the tape throughout the entirety of relative approaching movement between the tape and the paper and establishment of uniform contact between the two. This electrostatic field is generated between the aforementioned conductive portion of the magnetic tape being held at ground potential and a negative potential of predetermined magnitude, say 100 volts (for negatively charged toner), as a biasing voltage applied to electrode 45 (FIG. 1) under the control of controller 25. We have found that a preferred range of bias voltages for generating the bias field is from approximately −20 to −150 volts corresponding, for example, to widely varying humidity conditions, within given systems of commercially available toner and paper. The relationship between the conductive portion of the tape 13 and electrode 45 could be reversed, whereby electrode 45 is maintained at e.g., ground potential and the tape has applied thereto a potential of said predetermined magnitude with a polarity that will effect the desired electrostatic field, to augment, as before, the pre-existing attracting forces on the toner particles which urge same to remain clinging to the tape. The former arrangement, i.e., having the conductive portion of tape at ground potential at all times, is preferred because this provides the dual advantage that the tape will not be allowed to assume the potential of the scorotron during precharging (thus preventing the tape from possibly becoming more negative than the transfer electrode 45 which would tend to urge the toner to transfer without application of the actual transfer pulse) and the tape will be unable to become charged to the same potential as the toner.

At a time "C" following uniform contact between the tape and paper (actually point "C" may occur at "B'" or any time during the period of uniform contact), the polarity and magnitude of the potential in FIG. 5E are changed to result in a reversal of the electrostatic forces on the toner to begin transfer of the toner particles from tape to paper. We have determined that for the within mentioned given systems, a preferred range of transfer voltage is +400 to +800 volts (for negatively charged toner), and especially preferred magnitudes of the transfer potential between 600 to 800 volts. Below 400 volts experience has shown that the toner transfer efficiency suffers, and above 800 volts edge acuity tends to degrade.

To complete the transfer of toner to paper, the cam surface of the cam 76 (FIG. 2) is further rotated, or the drive current (FIG. 5B for the arrangement of FIG. 3) is such that at time "D" the platen 43 begins to reverse its travel as indicated in FIG. 5D. (For the embodiment of FIG. 3 this is due to the influence of gravitational forces). The tape, which will follow the platen, thus begins to separate from the paper, leaving behind the toner, under the influence of the electrostatic transfer forces. When separation between the tape and paper has progressed to a predetermined distance, i.e., at time "E" of FIG. 5E, the polarity of the transfer potential is again changed, with the magnitude again set to the bias potential ($\approx -100$ V). Subsequently, the tape segment is transported out of and away from the transfer zone as indicated via FIG. 5A. The period from time "A" to time "E" (FIG. 5A) constitutes a transfer cycle.

Specifically for the separation segment of the preferred drive current profile illustrated in FIG. 5B, to achieve a total minimum transfer cycle time a current profile substantially mirroring the approach segment profile is utilized. Thus, the platen and tape are allowed to coast (at approximately one gravity) for a short time immediately following actual separation to achieve a selected small displacement (to avoid disruption of the toner particle arrangement on the paper due to the aerodynamic forces of the rushing air associated with the separation). Therefollowing, the platen is positively accelerated downward and then decelerated to zero velocity, in achieving full separation of tape and paper once again.

FIG. 5E further illustrates, via dashed line, that the transfer potential need not be held completely constant. However, it is important that the potential be substantially maintained at least until actual transfer has occurred and for a time thereafter.

The pretransfer (bias) and transfer potentials have been selected at least in part to also satisfy the following requirements. The toner must remain on the paper throughout the period of relative separation of tape and paper and subsequent movement of the tape out of the transfer area. On the other hand, it is desired that no background toner be accumulated on the paper from residual toner which may be on the tape and/or from the next arriving toned segment. Thus, the bias field is applied preferably throughout operation at the transfer station except during the time the transfer field is to be generated. The latter field, then, is caused to be present and remain only so long as to permit transfer of toner to the paper, and to provide time for the tape and platen time to withdraw to a sufficient separation, i.e., a separation sufficiently large that the effect of the resumed bias field would not be strong enough to urge the toner particles now on the paper back across the separation to the tape. It should be appreciated that as of this point in time, the toner has not yet been more permanently affixed to the paper surface such as by fusing.

It is to be noted that it is well within the scope of this invention to provide the alternative considerations of precharging the toner positively, with corresponding bias and transfer potentials being accordingly reversed from the above-depicted example.

FIG. 6A depicts a graph of computed critical (maximum) tape velocity as a function of instantaneous separation utilizing equation I for toner-to-substrate (tape) holding forces of $2\times 10^{-4}$ dyne per toner particles as an example. Here, it is assumed that $r=10\times 10^{-4}$ cm, $\rho=1.3\times 10^{-3}$ gm/cc, and $w=1.25$ cm. This magnitude of toner-to-medium force is determined by experimental procedures for typical conditions, i.e., a given system. It should be noted that this force could vary substantially for different systems.

The vertical axis of FIG. 6A represents the tape critical (maximum) velocity in terms of cm/sec and the horizontal axis represents the instantaneous separation of the media (tape and paper) in units of $10^{-4}$ cm. The point "A" indicates the initial separation distance between the media, corresponding to point "A" of FIGS. 5A–5E. The dashed vertical line (identified as "B" to relate in time with point "B" of FIGS. 5A–5E) located at $20\times 10^{-4}$ cm indicates the separation distance at which toner particles normally first establish contact with the surface of the paper medium. In the case of a large toned area one could replace "h" with (h-$\delta$), where $\delta$ is the thickness of the toner layer; and for this case the paper surface is accordingly initially contacted by the toner at (h-$\delta$)=0.

As is illustrated by the graph of FIG. 6A, in order to not disturb the arrangement of the toner particles on either of the media and substantially preserve the integrity of the image quality, the approaching critical velocity near and at the point of contact between the substrates must be substantially smaller than the initial high velocities corresponding with the larger separation distances. Indeed, FIG. 6A illustrates the need for substantial reduction of tape velocity approaching the event of contact with the paper in order to prevent the disturbance of the toner particles arrangement.

FIG. 6B illustrates the aforementioned computed critical (maximum) tape velocity as a function of time for an initial separation of $1250\times 10^{-4}$ cm and toner-to-substrate forces of $2\times 10^{-4}$ dyne per toner particle. In this example calculation, it is depicted that the platen 43 is accelerated from a rest position to a velocity of approximately 30 cm/sec with a corresponding acceleration of 3900 cm/sec$^{-2}$ (approximately four g's). The platen 43 is then allowed to travel approximately $940\times 10^{-4}$ cm at this relatively high velocity. However, this velocity becomes critical at approximately the $310\times 10^{-4}$ cm separation distance (point Q' of FIG. 6B, corresponding to point Q in FIG. 6A) and, as illustrated in FIG. 6B, the velocity must be reduced drastically in order to prevent disturbance of the toner particle arrangement. Furthermore, as shown in FIG. 6B the approaching velocity is reduced continuously over a period of time until the toner establishes contact (point B in time) with the surface of the paper medium. Thus, FIG. 6B shows the control of the velocity needed in the time domain to substantially preserve the integrity of the image quality.

Figure 7:
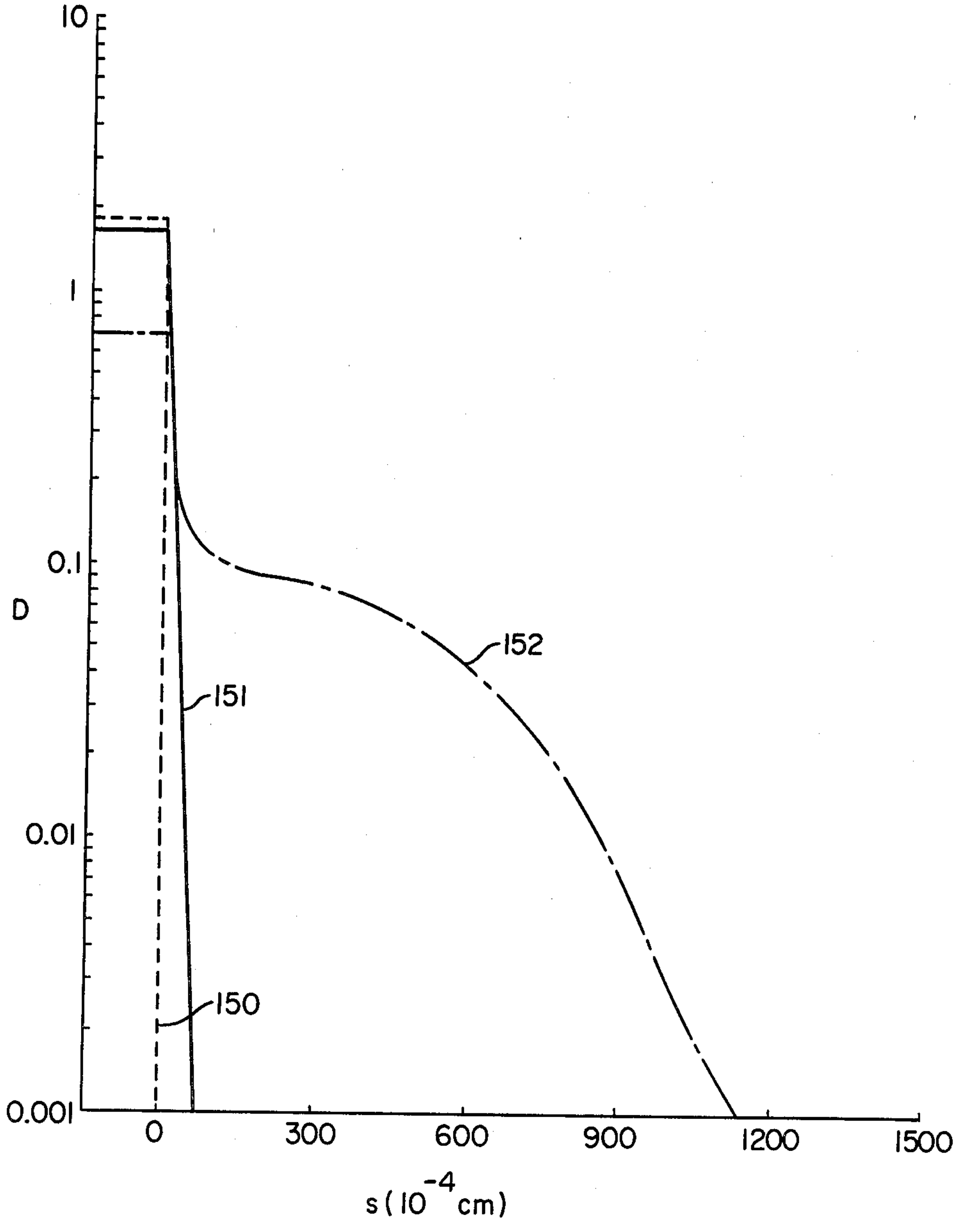
FIG. 7 is a graphic illustration of edge acuity, showing an ideal case, the case of transfer-station tape-to-paper relative velocity within the predetermined maximum of a given system and the case where said maximum for said system is exceeded.

FIG. 7 is a graphic presentation of the optical density, D, of toner on a character image on tape versus the distance, s, in the vicinity of the edge of the toned character image. The dashed line curve 150 corresponds with an ideal density and depicts a very sharp transition of optical density, D, from a high value (e.g., $D=1.8$) to zero within a relatively immeasurably short distance from the edge of the character image ($s\approx 0$) to the immediate surrounding background portion of the paper. The dot/dash line curve 152 depicts a condition of substantial toner spread at the edge of a toned character obtained from experiment in which the approach velocity of the tape has not been closely controlled, i.e. the tape approaching velocity has exceeded the critical (maximum) velocity for the system, and/or the tape has contacted the paper at an excessive velocity (e.g., five cm/second).

Since the normal naked eye can sense optical densities as low as 0.002, it is clear from curve 152 that the gradual transition of optical density from the edge of the character image ($s=0$) to distances as large as one millimeter (i.e., $s=1000\times 10^{-4}$ cm as depicted in FIG. 7 herein) corresponding to considerable toner spread, is readily detectable and is perceived as relatively poor edge sharpness or acuity. Further, the optical density of the character depicted in curve 152 has suffered, having decreased from 1.8 (chosen ideal case, corresponding to a dark black) to 0.7 (corresponding to a greyish appearance), which additionally degrades the image quality.

The solid curve 151, on the other hand, illustrates a dramatic improvement over curve 152. Curve 151 depicts a typical relatively high speed test in which the instantaneous or approach velocity of the tape was controlled throughout the transfer operation to remain near but below the critical (maximum) velocity, while keeping all other parameters of the system the same. As shown by curve 151, there is no significant amount of toner spread detectable to the human eye within a relatively very small distance of approximately $75\times10^{-4}$ cm. Further, the optical density of the toned character image has been insignificantly affected, i.e., nominally reduced from 1.8 (corresponding to the ideal curve) to 1.7. It is to be noted that at these high optical densities the naked human eye will be unable to appreciate such a small difference.

These illustrations and experimental results demonstrate that the present invention provides the dramatic improvement in edge acuity and image quality that is needed in high-speed printing for letter-quality applications. It is important to note also that a system in accordance with the invention thus provides real advantage in connection with computerized systems.

What is claimed is:

1. A method of letter-quality, relatively high-speed transfer of magnetic toner particles predeterminably arranged in the form of an image on a surface of a conductive magnetic medium to a generally parallel surface of a receiving medium, the steps comprising establishing at least a first pretransfer force of attraction ($f_1$) between the toner and the magnetic medium created by both electrostatic and magnetic fields, and effecting variable, relatively high speed, relative approaching, generally perpendicular movement between the magnetic and receiving mediums such that the maximum force ($f_2$) exerted on the toner particles by air currents between the magnetic and receiving mediums created by such movement is less than force ($f_1$) at all separation distances between the magnetic and receiving mediums.

2. The method of claim 1 further including the steps of terminating the attracting electrostatic field force and subjecting the toner particles to a transfer electrostatic field force during the period that the magnetic medium is in contact with the receiving medium to effect transfer of the toner particles from the magnetic to the receiving medium.

3. The method of claim 2 further including separating the magnetic and receiving mediums during application of the transfer electrostatic field, and maintaining said transfer field force until the magnetic and receiving mediums become separated by a predetermined distance.

4. The method of claim 1 wherein said effecting step includes:

determining the instantaneous maximum velocity (Vm) of relative movement of the magnetic and receiving mediums as a function of: the separation distance between the mediums; the width of the magnetic medium; the toner attracting force associated with magnetic medium; and a preselected maximum toner particle size at and below which maximum velocity the toner particles on the magnetic medium are retained without substantial disruption and moving the magnetic and receiving mediums relative to each other along the substantially perpendicular path at velocities that are equal to or less than (Vm).

5. A transfer method for magnetic toner particles arranged in an image configuration on a magnetic medium corresponding to a latent magnetic image, comprising:

(a) effecting in succession relatively perpendicular approaching movement at first and second velocities with the first velocity magnitude greater than the second, contact and relative perpendicular separating movement at third and fourth velocities with the third velocity magnitude less than the fourth between at least respective parallel portions of the facing surfaces of a toned magnetic medium and a toner receiving medium without disturbing the toner particle arrangement;

(b) subjecting the toner particles to a first electrostatic field, at least during the period of relative approaching movement, beginning with a predetermined first separation distance being reached between said magnetic and receiving mediums, said first electrostatic field having a predetermined magnitude and a direction which urges the toner particles substantially toward the magnetic medium and away from the receiving medium; and (c) discontinuing the first electrostatic field and subjecting the toner particles to a second electrostatic field having a direction which urges the toner particles substantially toward the receiving medium and away from the magnetic medium, for a predetermined time period following contact between said magnetic and receiving mediums and continuing after separation of the last mentioned mediums at least until a predetermined second separation distance between the last mentioned mediums is reached on relative separating movement thereof, said second electrostatic field having a predetermined minimum magnitude at least when separation of the first and second medium portions is effected.

6. The method of claim 5 wherein said effecting step includes:

determining the instantaneous maximum velocity (Vm) of relative movement of the magnetic and receiving mediums as a function of: the separation distance between the mediums; the width of the magnetic medium; the toner attracting force associated with magnetic medium; and a preselected maximum toner particle size at and below which maximum velocity the toner particles on the magnetic are retained without substantial disruption and moving the magnetic and receiving mediums relative to each other along the substantially perpendicular path at velocities that are equal to or less than (Vm).

7. A method of high-speed transfer of magnetic toner particles which are predeterminably arranged on a surface of an endless first magnetic medium of pre-selected width to a receiving medium comprising establishing a toner attracting force including electrostatic and magnetic field forces for attracting the toner to the magnetic medium:

selecting a maximum variable first rate and a maximum variable second rate of relative approaching, generally perpendicular movement between the magnetic and receiving mediums, which rates are defined at least in part by the instantaneous separation between the magnetic and receiving mediums, the width of the magnetic medium and the toner attracting force associated with the magnetic medium, said second rate being substantially less than the first rate;

selecting a first separation distance between the magnetic and receiving mediums;

effecting relative, generally perpendicular, approaching movement between the magnetic and receiving mediums at or below the maximum of said variable first rate until said first separation distance is reached; and therefollowing, effecting relative approaching movement between the magnetic and receiving mediums at or below the maximum of said second rate such that the magnetic and receiving mediums are brought into contact without disrupting the toner, said first separation distance and the maximums of said variable first and second rates being selected such that relative approaching movement between the magnetic and receiving mediums is achieved substantially without degradation of the toner particle arrangement on the magnetic medium.

8. The method of claim 7 further including the step of applying a force to the contacted magnetic and receiving mediums by attempting to continue advancing the magnetic medium relative to the receiving medium after contact is effected therebetween to achieve uniform contact of the last mentioned mediums.

9. The method of claim 7 further including the step of subjecting the toner particles on the magnetic medium to corona generating means for depositing charge on the toner particles to charge the particles and to create an electrostatic field for facilitating retainment of the toner on the magnetic medium during relative approaching movement thereof with the receiving medium.

10. A relatively high speed magnetic printing apparatus providing letter quality transfer of toner particles predeterminably arranged to correspond to a latent magnetic image on a surface of a magnetic medium to a receiving medium, the combination comprising means for establishing at least a first pretransfer force of attraction ($f_1$) including electrostatic and magnetic field forces between the toner and the magnetic medium and drive means for effecting relatively high speed, generally perpendicular relative approaching and separating, variable movement between the magnetic and receiving mediums according to the relationship that the maximum force ($f_2$) exerted on the toner particles by air currents created by such movement is less than the force ($f_1$) for any instantaneous separation between the magnetic and receiving mediums.

11. Magnetic toner particle transfer apparatus comprising:

a movably mounted, magnetic medium capable of having a magnetic toner carried thereby arranged to correspond to a magnetic field associated with the magnetic medium, said magnetic field defining a latent magnetic image, a platen positioned adjacent the magnetic medium on the non-toner bearing side thereof, a transfer electrode spaced from and generally parallel to the platen and toner particle bearing surface of the magnetic medium and adapted to have a receiving medium positioned between the electrode and the magnetic medium, electrical bias means coupled to the transfer electrode for establishing an electric field for retaining toner to the magnetic medium prior to contact of the magnetic medium with a receiving medium, drive means coupled to at least either the platen or transfer electrode for moving the platen and electrode relative to each other along a path that is generally perpendicular to their parallel surfaces at or below a first variable velocity until a selected relatively small separation distance between the magnetic medium and a receiving medium is reached and thereafter at a second variable velocity until contact occurs between the magnetic medium and a receiving medium, said first and second variable velocities being equal to or less than maximum rates below which the toner particle image on the magnetic medium remains substantially undisturbed by air currents created between the magnetic medium and a receiving medium.

12. The apparatus of claim 11 wherein the drive means includes coil means and permanent magnet means, the coil means being coupled to the platen for movement of the coil means and platen relative to the magnet means upon application of an electrical signal to the coil means.

13. The apparatus of claim 11 including corona generating means for depositing electrostatic charge on toner particles on the magnetic medium to charge the particles for facilitating retainment of the toner particles on the magnetic medium during relative movement between the magnetic and receiving mediums.

14. The apparatus of claim 11 wherein said drive means is coupled to the platen.

15. The apparatus of claim 14 wherein the drive means includes cam means having at least one cam surface in operative engagement with the platen.

16. The apparatus of claim 11 wherein said magnetic medium includes an electrically conductive layer and wherein the electrical bias means is coupled to the transfer electrode and the conductive layer of the magnetic medium for creating the electric field for retension of magnetic toner on the magnetic medium at least until contact is made between the magnetic medium and a receiving medium and for creating a transfer electric field during said contact for transferring magnetic toner from the magnetic medium to a receiving medium.

17. The apparatus of claim 16 wherein the conductive layer includes the surface of the magnetic medium carrying toner.

* * * * *